United States Patent [19]

Walker

[11] Patent Number: 4,477,009
[45] Date of Patent: Oct. 16, 1984

[54] TUNGSTEN CARBIDE REACTIVE PROCESS

[76] Inventor: Richard M. Walker, 5735 Warrenshire, Bloomfield, Mich. 48033

[21] Appl. No.: 356,104

[22] Filed: Mar. 8, 1982

[51] Int. Cl.³ ............................. B23B 1/20; B23P 6/04
[52] U.S. Cl. .......................................... 228/119; 436/5; 436/83
[58] Field of Search ...................... 228/119; 436/5, 23; 252/408.1, 960; 134/3, 28, 41; 73/104, 105, 150 R; 116/41, 206; 29/402.01, 402.13

[56] References Cited

U.S. PATENT DOCUMENTS

| | | | |
|---|---|---|---|
| 3,373,114 | 3/1968 | Grunwald | 134/3 |
| 3,565,688 | 2/1971 | Costelloe | 134/3 X |
| 3,652,225 | 3/1972 | Coffin, Jr. et al. | 436/5 |
| 3,833,414 | 9/1974 | Grisik et al. | 134/3 |
| 3,891,456 | 6/1975 | Hohman et al. | 134/3 |
| 4,059,884 | 11/1977 | Weill | 228/119 X |

FOREIGN PATENT DOCUMENTS

| | | | |
|---|---|---|---|
| 51-1048994 | 4/1976 | Japan | 116/206 |
| 643260 | 1/1979 | U.S.S.R. | 228/119 |

*Primary Examiner*—Nicholas P. Godici
*Assistant Examiner*—M. Jordan
*Attorney, Agent, or Firm*—David A. Maxon

[57] ABSTRACT

A process of identifying and cleaning carbide entities. In the preferred embodiment of this invention, a visual indicating reacting composition is placed in a tank. An example of such a compound is a weak solution on the order to magnitude of one tenth molar or less of copper sulfate. After preparation of this bath, a large plurality of used tungsten carbide tools are dumped into the bath. Tools are allowed to sit in the bath for periods extending from five seconds to several hours depending on the strength of the bath and the thickness of the coating. When a characteristic orange color appears on a significant plurality of the tools sitting in the bath, the tank is drained of the copper sulfate solution and the tools are dumped upon a flat surface for visual inspection and segregation of the copper colored tools from the clear ones. After segregation, the copper colored tools are placed in a second bath. The second bath comprises a weak acidic solution with pH of the order of magnitude of less than 7 and more than 5. Extremely dilute acid such as nitric acid may be used in such a bath. In the second bath, once the copper colored tools are placed in the bath, the acid reacts with the copper colored reactant on the tools to dissolve said reactant and render the tool clear and clean. In this bath other contaminants or foreign matter are removed from the surface of the tool.

11 Claims, No Drawings

TUNGSTEN CARBIDE REACTIVE PROCESS

This invention relates generally to identification and cleaning of tungsten carbide entities. More particularly, this invention relates to the process whereby particular coatings applied to tungsten carbide devices are identified and separated from such devices without such coatings. Tungsten carbide entitites are alternatively or additionally rendered free of foreign particles.

In the past, practioners in the art of dealing with tungsten carbide tools, or preparing such tools for commercial use, have discovered that one of the problems in the field in which tungsten carbide tools are used is the tendency for excessive wear in particular applications. Accordingly, a plurality of processes and structures has been utilized to modify tungsten carbide tools to provide longer wear and greater wear resistant characteristics of such tools. For example, coating processes have been developed whereby surface hardening characteristics are obtained by coatings utilizing tungsten carbide, titanium nitride, chrome, nitrogen entities, carbon entities, or aluminum oxide. Processes have been developed for applying such materials to tungsten carbide tools involving electroplating, case hardening, plasma spray, physical vapor deposition, chemical vapor deposition, or salt baths. A number of these structures and processes are discussed in publications of Scientific Coatings, Inc., of Troy, Mich. and SCI-Coat Tool, Inc., of Lancaster, Pa. Specifically, coatings SCI-5 and SCI-6 have been developed and discussed in such publications of SCI-Coat Tool, Inc., aforementioned.

One of the difficulties in the use of such processes and coatings is the difficulty of tinning or providing adhesion to other materials when attempt is made to re-use coated carbide tools. For example, it has been a practice in the prior art to reduce the size of such used tools by cutting them down and then attempting to braze them into a new tool for cutting or sharpening purposes. Another area in which used tungsten carbide tools or worn tungsten carbide tools are re-utilized for their tungsten carbide content in another tool-sharpening or cutting application subsequent to their original formation is the formation of crushed or broken used tungsten carbide tools applied to a large flat surface such as to coat a working edge or biting edge of a shovel or digging implement or mining or drilling tool. Similarly, a grinding tool such as sand mullers and the like utilize used tungsten carbide tools to form a grinding or wear surface for breaking up sand molds and the like in a sand muller.

In all of these applications it is necessary to adhere used tungsten carbide tools or broken or ground tungsten carbide tools into some medium, usually a metallic medium. For example, the tungsten carbide entities may be mixed with another molten metal to form a new entity.

Still another use is to apply it as a surface for wear-resistant characteristics on any metal member that rubs or comes into contact with motion with another metal or even non-metal entity. It resists abrasion and wear.

Another use of used tungsten carbide tools is in the forming of brazing rods and wear plates. This is used to braze onto a cutting tool such as a drilling head to periodically renew the wear surface of such head. This application is in mining, oil drilling and cutting tool industries. Another specific application is coating fishing tools in mining and oil drilling industries. Also such re-use is practiced in mills, reamers and other fishing tools.

In all of these applications it is necessary to adhere a tungsten carbide material to some other metal or surface. However, when the used tungsten carbide tool has been coated in the manner indicated above, the coating interferes with its adherence and reduces or eliminates tinning properties of the tungsten carbide tool. Thus, it prevents its re-use.

In the past, this problem has been attempted to be solved by individually applying to each used tool some indicator as to whether or not that tool has a coating or not. One of the problems with this approach is that it fails to deal with a large quantity of used tools at a particular time and is inefficient and expensive to utilize.

Another problem that has been encountered in the past to separate coated tungsten carbide material from uncoated material for subsequent use in a brazing or adhering condition is the failure in such process to completely remove foreign material or matter that may interfere with subsequent brazing or adhering.

Accordingly, it is an object of this invention to provide a method of segregating uncoated tungsten carbide material from tungsten carbide coated with wear resistant coating in order to enhance the tinning and adhering qualities of the tungsten carbide entity for subsequent adhering or brazing.

It is another object of this invention to provide a means for segregating significant quantities, for commercial application, coated from uncoated tungsten carbide used tools, in a manner that is inexpensive, uncomplicated and readily useable.

It is still another object of this invention to provide a process for segregation of coated from uncoated used tungsten carbide tools that substantially reduces foreign matter interfering with subsequent brazing or adhering to other metals.

These and other objects of this invention can be more fully understood from the following specifications and claims.

These and other objects of this invention are achieved by batch processing a large plurality of used tungsten carbide tools, where it is not feasible to be naked eye to separate the coated from uncoated tungsten carbide tools, placing such tools in a mixed condition in a bath of indicating medium providing visual identification means to uncoated materials by allowing the indicating medium to react chemically with the used tungsten carbide tools and utilizing visual distinctions generated by such reaction in segregating the coated from uncoated used tungsten carbide tools. A step of washing is utilized in batch process. The segregated used tungsten carbide tools that reacted with the visual reacting medium are washed in a bath. The bath cleanses the used tungsten carbide tools of any residue of chemical reaction with the visual indication means and any other matter foreign to the integrity of the tungsten carbide tool to facilitate subsequent brazing and adhering to a metallic medium.

Before explaining the present invention in detail, it is to be understood that the invention is not limited in its application to the details in construction and arrangement of parts specifically designated since the invention is capable of other embodiments and of being practiced or carried out in various ways.

Also, it is to be understood that the phraseology and terminology employed herein are for the purpose of description and not of limitation.

In the preferred embodiment of this invention, a visual indicating reacting composition is placed in a tank. An example of such a compound is a weak solution on the order of magnitude of one tenth molar or less of copper sulfate. After preparation of this bath, a large plurality of used tungsten carbide tools are dumped into the bath. Tools are allowed to sit in the bath for periods extending from five seconds to several hours depending on the strength of the bath and the thickness of the coating. When a characteristic orange color appears on a significant plurality of the tools sitting in the bath, the tank is drained of the copper sulfate solution and the tools are dumped upon a flat surface for visual inspection and segregation of the copper colored tools from the clear ones.

After segregation, the copper colored tools are placed in a second bath. The second bath comprises a weak acidic solution with a pH on the order of magnitude of less than 7 and more than 5. Extremely dilute acid such as nitric acid may be used in such a bath. In the second bath, once the copper colored tools are placed in the bath, the acid reacts with the copper colored reactant on the tools to dissolve said reactant and render the tool clear and clean. In this bath other contaminants or foreign matter are removed from the surface of the tool.

After washing in this bath, the resultant cleansed tools may be rinsed in a bath of water and the tools packaged and/or combined with appropriate shipping units. They are then ready for use directly by being combined, brazed or adhered to other metallic entities to form tools as indicated above. The above particular example is but one example of copper compounds that can be used in variations of the process as indicated above. Other cleaning agents other than the specific acidic specification indicated may be used.

Alternative to acidic bathing, or in conjunction therewith, or subsequent thereto, tumbling may be utilized. Wet or dry tumbling modes may be utilized subsequent to the initial bath of copper sulfate solution. The tumbling step is done in a manner well known in the art.

I claim:

1. In a process of segregating worn tungsten carbide tools, wherein a significant portion of a relatively large plurality of such tools has been coated with a coating selected from the group of titanium carbide, titanium nitride, chrome, nitrogen entity, carbon entity, and aluminum oxide, the improvements comprising:
   preparing a bath of a dilute salt, a metallic portion of the salt being copper;
   placing a large proportion of said plurality of worn tungsten carbide tools in said bath;
   allowing said plurality of tools to react in said bath for a period of more than five seconds and less than five hours;
   draining said tools from said solution;
   and segregating, in batch form, the drained tools;
   in the act of segregating, segregating by visual indication those tools that have a copper reactant on them as a result of said bath from those that do not.

2. In the process of claim 1, the additional step of preparing a second bath of dilute solution wherein said dilute solution is capable of reacting with a copper portion of whatever copper reactant has been deposited on said segregated copper reactant tools as a result of contact with the solution in said first bath, placing the segregated copper reactant tools having the copper reactant thereon in said second bath;
   allowing said segregated copper reactant tools to react in said second bath;
   draining said second bath from said segregated copper reactant tools.

3. In the process of claim 1, said first bath consisting of a dilute solution of copper sulfate.

4. In the process of claim 2, said second bath comprising a weak nitric acid solution.

5. In the process of claim 2, the additional step of sand blasting segregated copper reactant tools.

6. In the process of claim 2, the additional step of rubbing the copper reactant off said copper reactant tools.

7. In the process of claim 2, the additional step of tumbling said segregated copper reactant tools with one another to which, in the tumbling condition allows said segregated copper reactant tools to rub against one another and thereby remove the copper portion.

8. In the process of claim 2, mixing said segregated copper reactant tools with a cleansing agent such as stones or other large foreign objects, and allowing the segregated copper reactant tools to tumble with said cleaning agent to rub off the copper portion.

9. In the process of claim 2, the additional step of brazing the segregated copper reacting tools to a metalic medium.

10. In the process of claim 9, the additional step of providing a wear resistant surface with the entity made by said brazing.

11. In the process of claim 9, the additional step of providing a cutting medium with the entity made from said brazing.

* * * * *